United States Patent
Hasegawa et al.

(10) Patent No.: US 6,710,767 B1
(45) Date of Patent: Mar. 23, 2004

(54) COORDINATE INPUT APPARATUS

(75) Inventors: Masahide Hasegawa, Yokohama (JP); Kiwamu Kobayashi, Yokohama (JP); Masaaki Kanashiki, Yokohama (JP); Atsushi Tanaka, Yamato (JP); Yuichiro Yoshimura, Kamakura (JP); Katsuyuki Kobayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 236 days.

(21) Appl. No.: 09/654,393

(22) Filed: Sep. 1, 2000

(30) Foreign Application Priority Data

Sep. 6, 1999 (JP) .............................. 11-251934

(51) Int. Cl.[7] .................................................. B41J 2/47
(52) U.S. Cl. ...................... 345/157; 345/156; 345/166; 345/175; 345/179; 345/180; 345/183; 345/158; 128/18.01; 128/18.09; 128/18.11; 128/19.05; 341/5; 356/141.2; 356/141.5; 356/375; 356/400
(58) Field of Search ........................ 128/18.01, 18.09, 128/18.11, 19.05; 341/5; 345/157, 158, 166, 175, 179, 183, 180, 156; 356/141.2, 141.5, 375, 400

(56) References Cited

U.S. PATENT DOCUMENTS

| 5,101,285 A | * | 3/1992 | Kawai et al. | ............ | 250/208.1 |
|---|---|---|---|---|---|
| 5,115,230 A | | 5/1992 | Smoot | | |
| 5,341,155 A | | 8/1994 | Elrod et al. | | |
| 5,457,572 A | * | 10/1995 | Ishii et al. | .................. | 359/452 |
| 5,499,098 A | * | 3/1996 | Ogawa | .................... | 250/222.1 |
| 5,523,844 A | | 6/1996 | Hasegawa et al. | | |
| 5,572,251 A | * | 11/1996 | Ogawa | ........................ | 345/180 |
| 5,694,161 A | * | 12/1997 | Oikawa et al. | ............. | 347/136 |
| 6,229,601 B1 | * | 5/2001 | Hasegawa | ...................... | 341/5 |
| 6,285,782 B1 | * | 9/2001 | Inoue et al. | ................. | 382/145 |
| 6,323,839 B1 | * | 11/2001 | Fukuda et al. | ............. | 345/157 |
| 6,339,748 B1 | * | 1/2002 | Hiramatsu | .................. | 345/156 |
| 6,407,829 B1 | * | 6/2002 | Nakamura | ............... | 250/559.4 |

FOREIGN PATENT DOCUMENTS

| JP | 6-274266 | 9/1904 |
|---|---|---|
| JP | 2503182 | 3/1996 |

* cited by examiner

*Primary Examiner*—Bipin Shalwala
*Assistant Examiner*—Vincent E. Kovalick
(74) *Attorney, Agent, or Firm*—Fitzpatrick, Cella, Harper & Scinto

(57) ABSTRACT

A first cylindrical lens and a first linear sensor are constructed on the X axis, a second cylindrical lens and a second linear sensor are constructed on the Y axis, the X and Y axes are orthogonal, and the image width of a beam spot formed by each of the first and second cylindrical lenses is larger than each pixel of the corresponding first and second linear sensors.

7 Claims, 14 Drawing Sheets

FIG. 3

| SWITCH A | SWITCH B | SWITCH C | SWITCH D | LIGHT EMISSION | PEN DOWN | PEN BUTTON |
|---|---|---|---|---|---|---|
| × | × | — | — | OFF | OFF | OFF |
| ○ | × | × | × | ON | OFF | OFF |
| ○ | × | ○ | × | ON | ON | OFF |
| ○ | × | × | ○ | ON | OFF | ON |
| ○ | × | ○ | ○ | ON | ON | ON |
| ○ | ○ | — | — | ON | ON | ON |
| × | ○ | — | — | ON | ON | OFF |

COORDINATE INPUT APPARATUS

FIELD OF THE INVENTION

This invention relates to a coordinate input apparatus for generating coordinates corresponding to a beam spot produced by a designating tool.

BACKGROUND OF THE INVENTION

Known examples of an input apparatus according to the prior art include one in which a beam spot on a screen is sensed using a CCD area sensor or linear CCD sensor and image processing using coordinates of the center of gravity or pattern matching is executed to calculate and output coordinate values, and one in which use is made of a position sensing device referred to as a PSD (an analog device in which an output voltage corresponding to the position of the spot is obtained).

By way of example, the specification of Japanese Patent Publication (KOKOKU) No. 7-76902 discloses an apparatus in which a beam spot produced by a parallel beam of visible light is sensed by a video camera to detect the coordinates of the beam spot and, at the same time, a control signal is sent and received in the form of infrared diffused light. Further, the specification of Japanese Patent Application Laid-Open (KOKAI) No. 6-274266 discloses an apparatus in which coordinates are detected using a linear CCD sensor and a special optical mask.

On the other hand, Japanese Patent No. 2503182 discloses the construction of an apparatus which uses a PSD and a method of correcting output coordinates in this apparatus.

Large-screen displays of improved brightness can now be used satisfactorily even in brightly lit environments and, as a result, demand for such displays is growing. A coordinate input apparatus combined with such a large-screen display also needs to be unaffected by extraneous light so as to be usable in brightly lit environments. In addition, devices which utilize infrared light are finding wider use as wireless communication means and there is a tendency for extraneous light to increase together with infrared light and visible light. Accordingly, that the apparatus be unaffected by extraneous light is an important characteristic.

However, with a coordinate input apparatus using a linear CCD sensor as set forth in the specifications of Japanese Patent Publication No. 7-76902 and Japanese Patent Application Laid-Open (Kokai) No. 6-274266, extraneous light can be suppressed only by an optical filter.

By contrast, with the coordinate input apparatus using the PSD as set forth in Japanese Patent No. 2503182, the intensity of light is frequency modulated and the modulated light is synchronously detected to thereby enable suppression of the effects of extraneous light. This means that making joint use of an optical filter provides a characteristic that is resistant to external disturbance.

The resolution of large-screen displays is being improved along with the brightness of such displays. Accordingly, though it is necessary to improve the resolution of the coordinate input apparatus as well, the PSD, which is strongly resistant to external disturbances, presents a problem in this respect. Specifically, the dynamic range of the sensor output voltage corresponds directly to the input range. Consequently, in a case where the overall coordinate input area is broken down into 1000 coordinates, for example, an S/N ratio of at least 60 dB is required. Furthermore, a digital correction of linearity error is essential, as set forth in Japanese Patent No. 2503182, and this necessitates a highly precise analog circuit, a multiple-bit A/D converter and an arithmetic circuit. Further, since the S/N ratio of the sensor output signal is dependent upon the amount of light and the sharpness of the beam spot, satisfactory effects are not obtained solely through reliance upon the above-mentioned external-disturbance suppression property. This means that a bright, highly precise optical system is necessary. Such an optical system also is very high in cost.

The specification of Japanese Patent Publication No. 7-76902 discloses simultaneous use of a plurality of video cameras as a method of raising the resolution of a coordinate input apparatus that uses a linear CCD sensor. However, it is obvious that this approach leads to an apparatus of large size and high cost. Of course, using a single video camera having a large number of pixels would result in even a larger size and higher cost than in a case where a plurality of cameras are used. Further, in order to achieve a resolution greater than the number of pixels by image processing, an enormous quantity of image data must be processed at high speed. As a consequence, a very large and costly apparatus is required to achieve real-time operation.

The invention described in Japanese Patent Publication No. 6-274266 is contrived to obtain a high resolution by a special mask and signal processing. If there is little extraneous light and a good S/N ratio can be assured, an improvement in resolution is possible. In actuality, however, the image formed with a linear CCD sensor is linear and, in comparison with an area sensor in which a point image is formed, separation from extraneous light cannot be performed in a plane. The apparatus therefore is susceptible to the effects of extraneous light. Such an apparatus is applicable only in special environments in which there is little extraneous light.

SUMMARY OF THE INVENTION

Accordingly, an object of the present invention is to provide a coordinate input apparatus with which coordinates can be input at low cost and in highly precise fashion.

According to the present invention, the foregoing object is attained by providing a coordinate input apparatus for generating coordinates corresponding to a beam spot produced by a designating tool, the apparatus comprising: first image sensing means, which is constructed on a first coordinate axis by a first image-forming optical system and a first sensor array, for sensing the beam spot; and second image sensing means, which is constructed on a second coordinate axis by a second image-forming optical system and a second sensor array, for sensing the beam spot; wherein the first and second coordinate axes are orthogonal and image width of the beam spot formed by each of the first and second image-forming optical systems is larger than each pixel of the corresponding first and second sensor arrays.

The apparatus preferably further comprises adjustment means for adjusting the image width of the beam spot formed by each of the first and second image-forming optical systems.

The adjustment means preferably is a light diffusing plate.

The light diffusing plate preferably is placed on the side of the coordinate input screen facing the image-forming optical systems.

The light diffusing plate preferably has wavelength-selective transmissivity.

The light diffusing plate preferably is constituted by an infrared transmitting filter and a light diffusing film.

The light diffusing plate preferably is bonded to the first and second linear sensors.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 3 is a diagram illustrating the operating mode of the designating tool according to the first embodiment;

DESCRIPTION OF THE PREFERRED EMBODIMENTS

Preferred embodiments of the present invention will now be described in detail with reference to the drawings.

First Embodiment

The general construction of an optical coordinate input apparatus according to the present invention will be described with reference to FIG. 1.

Figure 1:
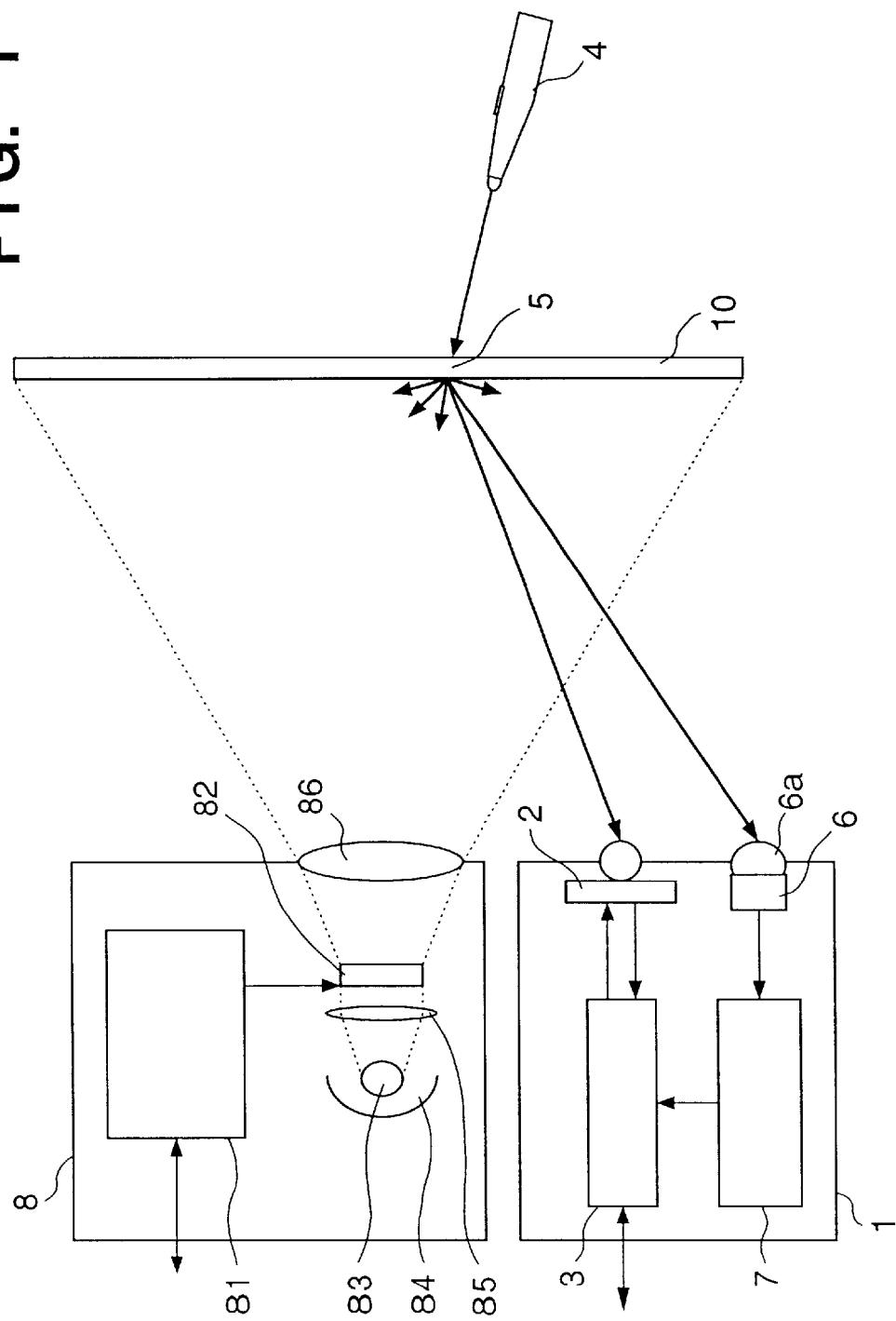
FIG. 1 is a diagram schematically illustrating the construction of a coordinate input apparatus according to a first embodiment of the present invention.

FIG. 1 is a diagram schematically illustrating the construction of a coordinate input apparatus according to a first embodiment of the present invention.

Broadly speaking, the coordinate input apparatus comprises a designating tool 4 for forming a beam spot 5 on a screen 10 serving as a coordinate input surface, and a coordinate detector 1 for detecting the coordinates of the position of a beam spot 5 on the screen 10. FIG. 1 illustrates a projection-type display unit 8 which, in combination with these components, serves as an output device for displaying an image or positional coordinates on the screen 10.

The coordinate detector 1 includes a coordinate sensing unit 2, a controller 3 for controlling the coordinate sensing unit 2 and calculating coordinates, a photoreceptor 6 and a signal processor 7. The coordinate detector 1 is adapted to detect the coordinates of the beam spot 5 on the screen 10 and control signals corresponding to various states (described later) of the designating tool 4, and to transmit this information to an externally connected unit (not shown) by the controller 3.

The projection-type display unit 8 comprises an image signal processor 81 to which is input an image signal from a display signal source constituted by an externally connected device such as a host computer (not shown), a liquid crystal display panel 82 controlled by the processor 81, an illuminating optical system comprising a lamp 83, a mirror 84 and a condenser 85, and a projecting lens 86 for projecting the image of the liquid crystal panel 82 onto the screen 10, whereby desired information can be displayed on the screen 10. The latter has a suitable light diffusing property in order to broaden the range over which the projected image can be observed. As a result, the light beam emitted from the designating tool 4 also is diffused at the position of the beam spot 5 so that some of the light diffused at the position of the beam spot 5 will impinge upon the coordinate detector 1 regardless of the position on the screen and the direction of the light beam.

By virtue of this arrangement, character information or line-drawing information is input on the screen 10 by the designating tool 4 and this information is displayed by the projection-type display unit 8, whereby it is possible to input or output information just as if a pencil and paper were being used. In addition, a button operation or an input operation such as selection of an icon can be performed freely.

<Detailed Description of Designating Tool 4>

Figure 2:
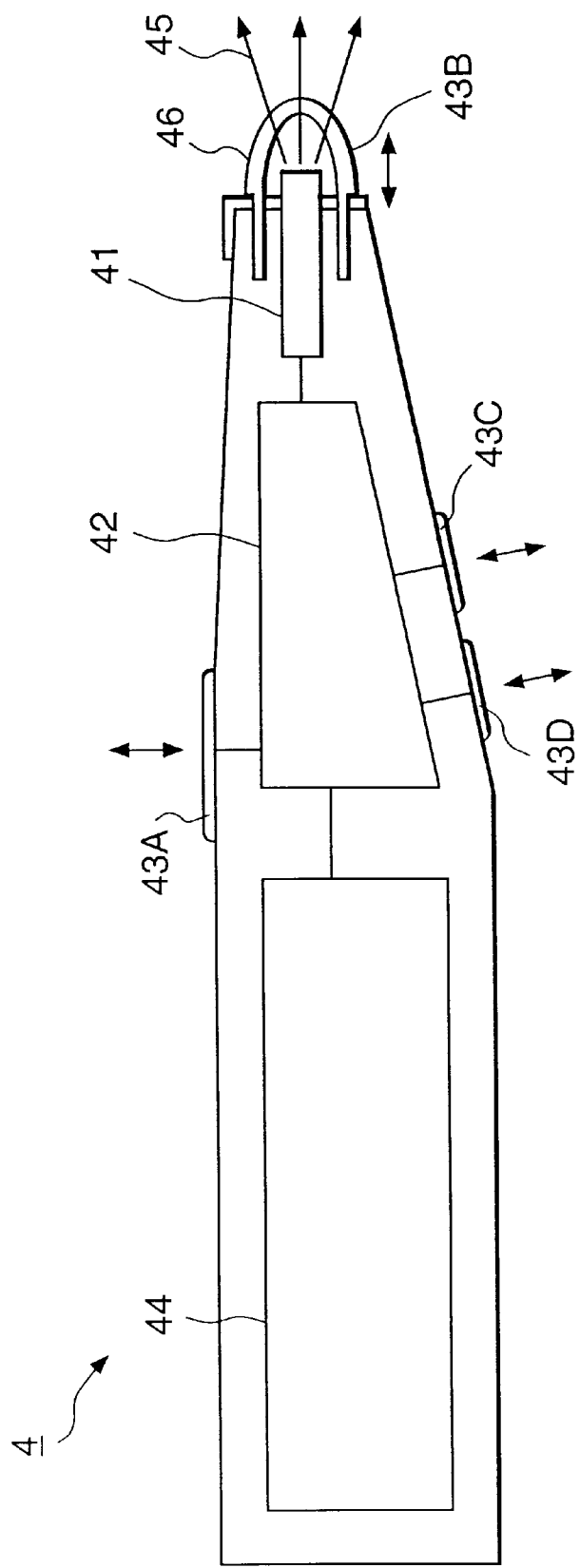
FIG. 2 is a diagram illustrating the detailed construction of a designating tool according to the first embodiment.

FIG. 2 is a diagram illustrating the details of the designating tool 4 according to the first embodiment.

As shown in FIG. 2, the designating tool 4 is internally provided with a light-emitting element 41 such as a semiconductor laser for emitting a light beam or an LED for emitting infrared light, a light-emission controller 42 for driving and controlling the light emission, a power supply unit 44 such as a battery, operating switches 43A to 43D, and a removable cap 46 consisting of a transparent member for covering the light-emitting element 41. The light-emission controller 42 performs light-emission control, in which control signals are superimposed, by turning the light emission on and off depending upon the states of the operating s witches 43A to 43D and a modulating method described later.

FIG. 3 illustrates the operating modes of the designating tool 4 according to the first embodiment.

Switches A to D correspond to the switches 43A to 43D, respectively, of FIG. 2. In FIG. 3, "light emission" corresponds to a light-emission signal (coordinate signal), and "pen down" and "pen button" correspond to control signals.

The operator grasps the designating tool 4 and points its tip toward the s creen 10. The switch 43A is placed at a position where it will be contacted naturally by the operator's thumb. Pressing the switch 43A causes the emission of a light beam 45. As a result, the beam spot 5 is produced on the screen 10 and a coordinate signal starts being output by predetermined processing. In this state, however, the pen-down and pen-button control signals are OFF. As a consequence, only an indication of a designated position is presented to the operator as by motion of a cursor or a changeover in the highlighting of a button, etc.

By pressing the switches 43C and 43D, which are placed at positions contacted naturally by the operator's index and middle fingers, the pen-down and pen-button control signals become signals superimposed upon the light-emission signal, as indicated in FIG. 3. In other words, pressing the switch 43C establishes the pen-down state, thereby making it possible to execute screen control such as the start of a character or line-drawing input or the selection of a button. Pressing the switch 43D establishes the pen-button state, in which it is possible to accommodate other functions such as the calling of a menu. As a result, by using only one hand, the operator can immediately write a character or figure correctly at any position on the screen 10 or can select a button or menu. Thus, the designating tool 4 can be operated nimbly.

The tip of the designating tool 4 is provided with the switch 43B. This switch is operated by pressing the tip of the designating tool 4 against the screen 10. The operator grasps the designating tool 4 and presses its tip against the screen, thereby establishing the pen-down state. Thus, a natural pen input operation can be performed without needless operation of buttons.

The switch 43A has a pen-button function. Of course, if the switch 43A is pressed without pressing the designating tool 4 against the screen, it is possible to move only the cursor. In actuality, rather than performing input of a character or figure at a distance from the screen, somewhat better operability and accuracy are obtained by pressing the designating tool 4 directly against the screen. In the first embodiment, a natural, nimble operation thus is possible at a distance from the screen or immediately in front of the screen using the four switches, and the designating tool 4 can be used properly in accordance with the particular case. Furthermore, in case of direct input only (wherein the designating tool 4 is not used as a pointer), a diffuse light source will be satisfactory and a light beam will not be required. In such case it is possible to use an LED, which is less expensive than a semiconductor laser and longer in life.

Further, the light-emission controller 42 may be set so as to transmit a unique ID number together with a control signal in order to deal with a case where two types of designating tools 4, one for up-close work and one for remote work, are used or are operated by two or more people simultaneously, or in a case where use is made of a plurality of designating tools 4 having different attributes such as color and thickness of a drawn line. The attributes such as the color and thickness of a drawn line are decided by software on the side of the externally connected device in association with the transmitted ID number, and a button or menu on the screen 10 can be set and changed. This operation may be performed by providing the designating tool 4 with a separate operating button and transmitting a command signal to effect the change. With regard to these settings, the particular state can be retained within the designating tool 4 or within the coordinate detector 1 and the attribute information can be transmitted to the externally connected device without use of an ID number.

Such an additional operating button makes possible the setting of other functions. For example, it is possible to turn the display unit on and off, to changeover the signal source or to operate a recording device or the like. Furthermore, it is possible to transmit a variety of useful signals. For example, by providing one or both of the switches 43A, 43B with pressure detecting means, writing pressure can be detected and the writing-pressure data can be transmitted together with a control signal.

If the switch 43A or 43B of the designating tool 4 is turned on, emission of light starts and the light-emission signal is output. Output first is a header comprising a leader, which consists of a comparatively long sequence of successive pulses, and a code (maker ID, etc.) that follows the leader. Next, a transmission data sequence, which comprises the pen ID and control signals, etc., is output successively in accordance with a sequence and format defined in advance (see signal LSG in FIG. 5).

In this embodiment, the modulation format is such that the "1" bits of the data bits have twice the intervals of the "0" bits, though various data encoding schemes can be used. However, that the average amount of light be fixed is desirable in order to detect coordinates, as will be described later, and that the clock component be sufficiently large is desirable in order to tune a PLL. In addition, in view of the amount of data to be transmitted, there is no harm in providing a comparatively high degree of redundancy. Taking these facts into consideration, this embodiment performs encoding through a method wherein 6-bit (64 items of) data is assigned to 108 codes in which the numbers of "1"s and "0"s are the same and the number of consecutive bits which are "1"s or "0"s is three or less in a code having a length of ten bits. By adopting such an encoding scheme, average power is rendered constant and a satisfactory clock component is included. This makes it possible to readily generate a stable synchronizing signal at the time of demodulation.

As mentioned above, the pen-down and pen-button control signals are two-bit signals. However, other items of long data such as an ID must also be transmitted. Accordingly, in the first embodiment, 24 bits are adopted as one block, in which the two leading bits are for the control signal, the next two bits are for an internal identification code (e.g., "00" represents the writing pressure signal and "11" the ID), the next two bits are for the related parity check, the next 16 bits represent data and the final two bits are for the related parity check. If this data is encoded by the scheme described above, a signal having a length of 40 bits will be obtained. A 10-bit sync code is added onto the beginning of this signal. The sync code uses a special code, namely a code composed of five successive "0"s and five successive "1"s or a pattern that is the inverse thereof (the changeover being made depending upon whether the end of the immediately preceding block is "1" or "0"). This makes it possible to readily distinguish between this code and a data word. In addition, a position even along a data string can be identified with certainty so that the data can be reconstructed. In one block, therefore, a transmission signal having a length of 50 bits is obtained, and a control signal and 16-bit data such as an ID or writing pressure are transmitted.

In the first embodiment, 7.5 kHz, which is ⅛ of a first frequency of 60 kHz, is adopted as a second frequency. However, since the above-mentioned encoding scheme is adopted, the average transmission bit rate is ⅔ of the first frequency, or 5 kHz. Since one block is 50 bits, 24-bit data of one block is transmitted at a frequency of 100 Hz. Accordingly, the effective bit rate exclusive of parity is 2000 BPS. Thus, though redundancy is high, erroneous detection is prevented and synchronization is achieved with ease. This can be realized through a very simple arrangement. Further, by making joint use of a phase synchronizing signal for sensor control, described later, and a check of the repetitive period of the sync code, follow-up can be performed even in a case where a signal develops short drop-out. Conversely, a case in which a quick operation such as pen-up or double-tap has been performed can be identified reliably depending upon whether or not there is a header signal.

<Detailed Description of Coordinate Detector 1>

Figure 4:
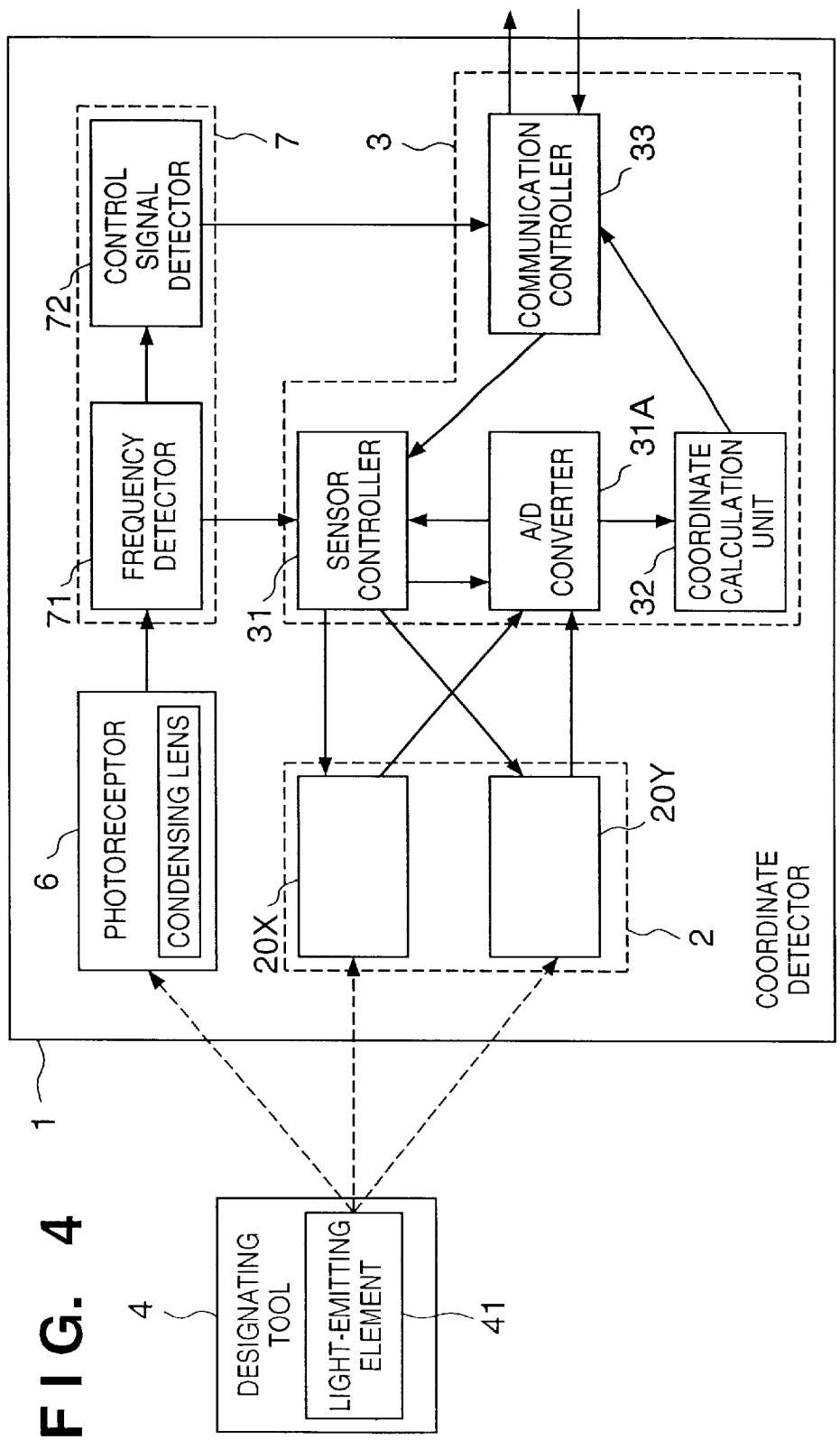
FIG. 4 is a diagram illustrating the detailed construction of a coordinate detector according to the first embodiment.

FIG. 4 is a diagram illustrating the details of the coordinate detector 1 according to the first embodiment.

The coordinate detector 1 is provided with the photoreceptor 6 for high-sensitivity detection of amount of light by a condensing optical system, and with two linear sensors 20X, 20Y for detecting direction of arriving light by an image-forming optical system. Each of these receives diffused light from the beam spot 5 produced on the screen 10 by the light beam from the light-emitting element 41 built in the designating tool 4.

<Description of Operation of Condensing Optical System>

A condensing lens 6a serving as a condensing optical system is mounted on the photoreceptor 6 for sensing, with a high sensitivity, the amount of light of a certain wavelength from the entire area of the screen 10. The output of the condensing lens 6a is detected by a frequency detector 71, after which the detected signal is demodulated by a control signal detector 72 to a digital signal which includes the data of a control signal (a signal superimposed by the light-emission controller 42 of the designating tool 4), etc.

A timing chart of the operation for restoring the control signal will now be described.

Figure 5:
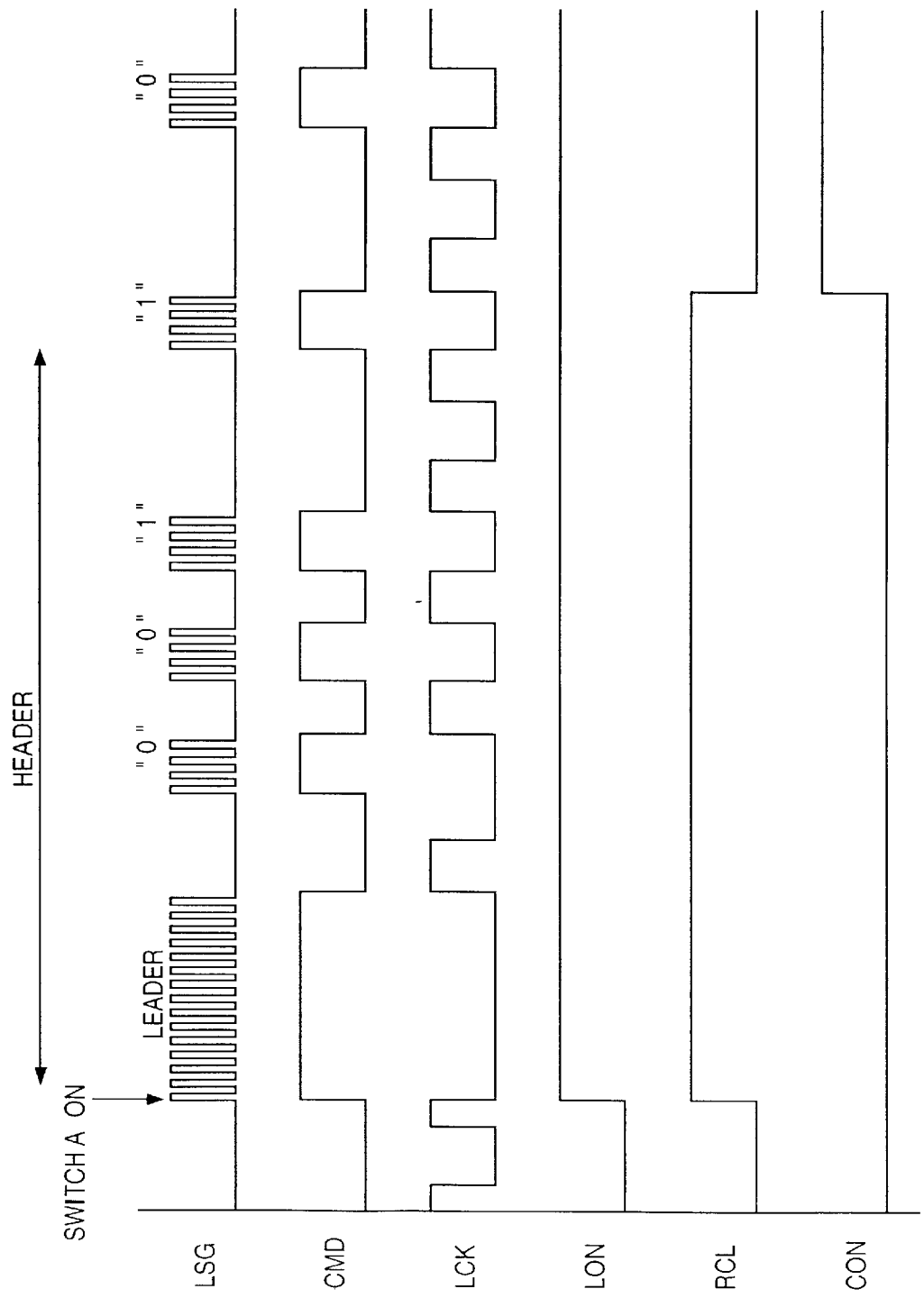
FIG. 5 is a timing chart illustrating restoration of a control signal according to the first embodiment.

FIG. 5 is a timing chart illustrating restoration of a control signal according to the first embodiment.

The data signal comprising the bit sequence described above is sensed as an optical output signal LSG by the photoreceptor 6 and this signal is detected by the frequency detector 71. The latter is adapted so as to be tuned to the pulse cycle of the first frequency, which is the highest in the optical output signal LSG. By making joint use of an optical filter, a modulated signal CMD is demodulated without being affected by extraneous light. The detection method is similar to that of an infrared remote controller that is in wide use and is a highly reliable wireless communication method.

In the first embodiment, a frequency of 60 kHz, which is higher than that of the generally employed infrared remote controller, is used as the first frequency, so that erroneous operation will not occur even if a remote controller is used at the same time. However, it is possible to place the first frequency in a band the same as that of the generally employed infrared remote controller, in which case erroneous operation would be prevented by identification based upon an ID or the like.

The modulated signal CMD detected by the frequency detector 71 is interpreted as digital data by the control signal detector 72, and a control signal such as pen-down or pen button is restored. The restored control signal is sent to a communication controller 33. The period of code modulation of the second frequency included in the modulated signal CMD is detected by the a sensor controller 31, and the linear sensors 20X, 20Y are controlled by this signal. That is, the sensor controller 31 is reset at the timing of the header shown in FIG. 5, after which a signal LCK phase-synchronized to the falling edge of the modulated signal CMD is generated.

Accordingly, the generated signal LCK is a signal of a fixed frequency synchronized to the absence or presence of a light emission from the designating tool 4. Further, a signal LON indicating whether or not there is a light input and a sensor-reset signal RCL activated by the signal LON are generated from the modulated signal CMD. The two linear sensors 20X, 20Y are reset while the sensor reset signal RCL is at the high level, and a synchronous integration operation, described later, starts at the timing of the falling edge of the sensor reset signal RCL, which is synchronized to the rising edge of the signal LCK.

If the control signal detector 72 detects the header and confirms that input from the designating tool 4 has started and that this is not noise or an input from another device, a signal indicative of this confirmation is sent from the communication controller 33 to the sensor controller 31, a signal CON indicating that operation of the linear sensors 20X, 20Y is valid is set to the high level and operation of a coordinate calculation unit 32 begins.

Figure 6:
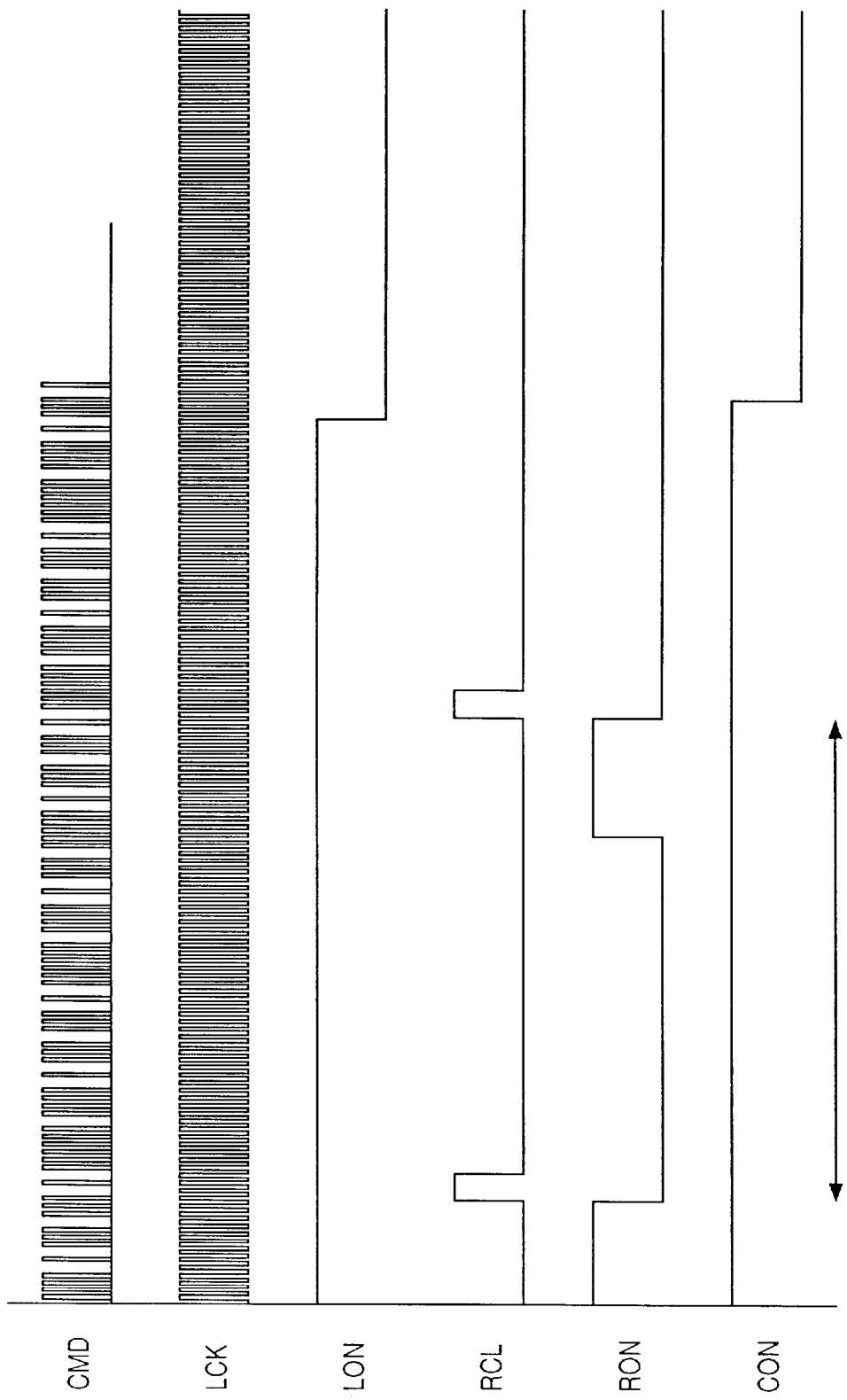
FIG. 6 is a timing chart illustrating signals handled according to the first embodiment.

FIG. 6 is a timing chart for when the optical output signal LSG vanishes and a series of operations ends. If the modulated signal CMD detected from the optical output signal LSG continues at the low level for a fixed period of time or greater, the signal LON indicating whether an optical input is present or not falls to the low level and so does the signal CON indicating that sensor operation is valid. As a result, the coordinate output operation by the linear sensors 20X, 20Y is terminated.

<Description of Operation of Image-forming Optical System>

Figure 7:
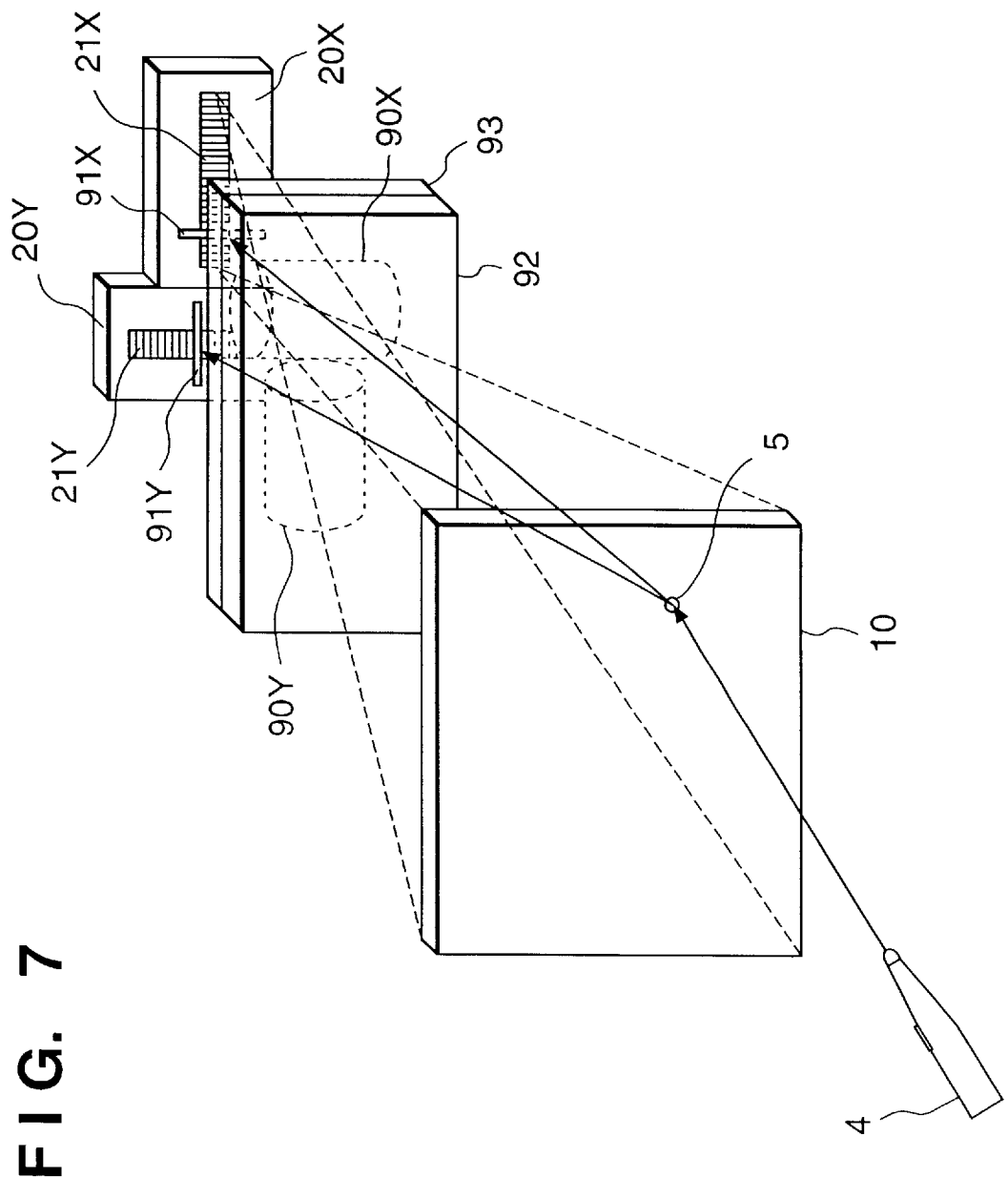
FIG. 7 is a diagram showing the positional relationship between linear sensors 20X, 20Y according to the first embodiment.

FIG. 7 is a diagram showing the positional relationship between the linear sensors 20X, 20Y according to the first embodiment.

The image of the beam spot 5 is formed in the shape of a line on each of photosensitive portions 21X, 21Y of respective ones of the linear sensors 20X, 20Y by cylindrical lenses 90X, 90Y, respectively, serving as the image-forming optical system. By disposing the linear sensors 20X, 20Y exactly at right angles, the sensors produce outputs having peaks at the pixels which reflect the X and Y coordinates, respectively, of the beam spot.

The linear sensors 20X, 20Y are controlled by the sensor controller 31 and the output signals of the sensors are sent to the coordinate calculation unit 32 as digital signals by an A/D converter 31A. The coordinate calculation unit 32 calculates the output coordinates from the input digital signals and sends the result of calculation to an external control unit (not shown) by a predetermined communication method via the communication controller 33 together with data such as the control signal from the control signal detector 72. In a case where an operation (e.g., setting of a calibration value by a user) different from that of the usual operation is performed, as when an adjustment is carried out, the communication controller 33 sends a mode changeover signal to the sensor controller 31 and coordinate calculation unit 32.

According to the present invention, a light diffusing plate is constructed by affixing a light diffusing film 93 to an infrared transmitting filter 92. The light diffusing plate is disposed in front of the cylindrical lenses 90X, 90Y in such a manner that the image of the beam spot 5 will have an image width that is several times the pixels of the linear sensors 20X, 20Y. Thus, the light diffusing plate produces blurring intentionally. In accordance with an experiment in which use was made of plastic cylindrical lenses having a diameter of 1.5 mm, an effective 64-pixel linear CCD having a pixel pitch of about 15 $\mu$m and an infrared LED, it was found that if the image is formed to maximum sharpness, an image width of less than 15 $\mu$m is obtained over the entirety of a field angle of about 40°. It was found that trace drawn by the result of pixel-to-pixel partitioning calculation was distorted in stepwise fashion under these conditions. Accordingly, use was made of a light diffusing film which provides an image width of 30 to 60 $\mu$m. If the degree of optical diffusion is too high, blurring becomes excessive and the peak level declines. An image width on the order of several pixels, therefore, is best. A characterizing feature of the present invention is to use a CCD having a small number of pixels and an optical system which furnishes a suitable amount of blurring. By using such a combination, it is possible to realize an inexpensive coordinate input apparatus in which the amount of calculation data is small and with which a very high resolution, high precision and high speed can be obtained using a small sensor and optical system.

Various materials such as PET, TAC, PC and urethane having different diffusion performances are available as the light diffusing film. Further, a diffusing material may be mixed with a sheet material such as an acrylic sheet or plate glass, or these materials may be have their surfaces roughened to provide them with a diffusing property. In the first embodiment, use is made of the light diffusing film 93 such as PET bonded to the infrared transmitting filter 92 that provides an acrylic sheet with an infrared transmitting characteristic (a wavelength-selective transmitting property). An advantage is that various characteristics can be selected by combining products available on the market. It goes without saying that by mixing an acrylic material for an infrared filter with a diffusing material or roughening the surface of the acrylic material, it is possible to fabricate a product having a suitable characteristic without a bonding step.

In a case where the light diffusing film 93 is disposed on the light-source side of the cylindrical lenses 90X, 90Y, the amount of incident light is large in comparison with the pixel size. This lessens the influence of the size of the microstructure of the diffusing material (or the roughened surface or added diffusing material). As a result, the image is not distorted and there is no danger that the precision of the coordinates will be adversely affected.

The linear sensor 20X for sensing X coordinates and the linear sensor 20Y for sensing Y coordinates, which are disposed in the form of an array, are identical in construction. The details of this construction will be described with reference to FIG. 8.

Figure 8:
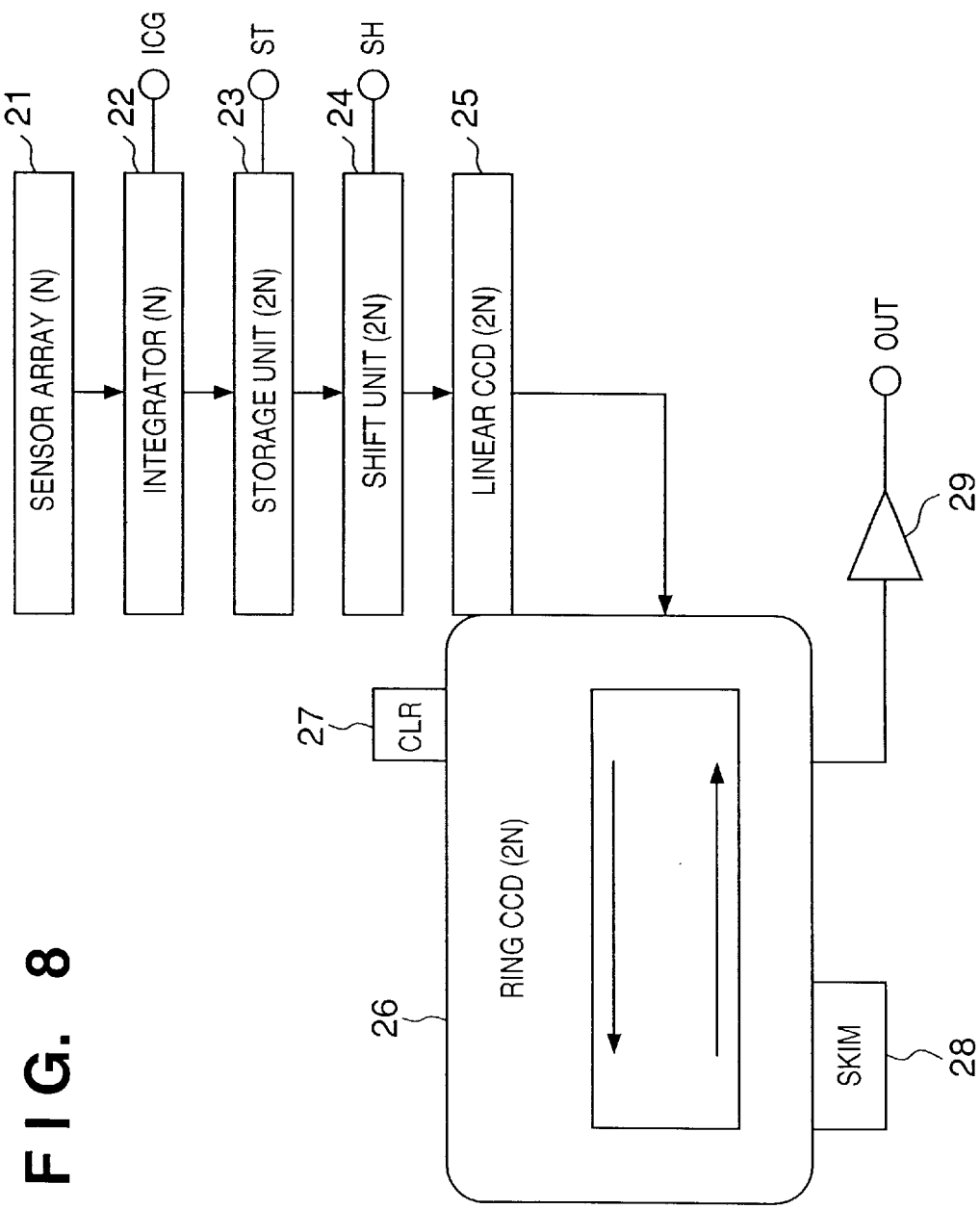
FIG. 8 is a diagram illustrating the detailed construction of a linear sensor according to the first embodiment.

FIG. 8 is a diagram illustrating the detailed construction of a linear sensor according to the first embodiment.

A sensor array 21 which is the photoreceptor unit comprises N-number of pixels (64 in the first embodiment). Electric charge conforming to the amount of received light is stored in an integrator 22. The integrator 22, which comprises 64 integrators, can be reset by applying a voltage to a gate ICG. This makes possible an electronic shutter operation. The electric charge that accumulated in the integrator 22 is transferred to a storage unit 23 by applying a pulsed voltage to an electrode ST. The storage unit 23 comprises two storage units which separately and respectively store electric charge in conformity with H and L levels of an IRCLK signal synchronized to the light-emission timing of the designating tool 4. Thereafter, in sync with the turning on and off of the light, the electric charge that has been separately stored is transferred to a linear CCD unit 25, which comprises two CCDs, via a shift unit 24, which comprises two shifters, provided in order to simplify the transfer clock.

As a result, electric charge corresponding to the turning on and off of the light output from the sensor of N-number of pixels is stored as a row of contiguous charge. The electric charge arrayed in the CCD unit 25 is transferred successively to a ring CCD 26 comprising two CCDs. After the ring CCD 26 is emptied by a CLR unit 27 in response to a CLR signal, electric charge from the linear CCD unit 25 is stored successively.

The electric charge thus stored is read out by an amplifier 29. The latter outputs non-destructively a voltage proportional to the amount of stored charge. In actuality, the difference between mutually adjacent amounts of charge, namely a value obtained by subtracting amount of charge in the absence of a light emission from amount of charge at emission of light from the light-emitting element 41, is amplified and output.

An example of the output waveforms obtained from the linear sensors 20X, 20Y at this time will be described with reference to FIG. 9.

Figure 9:
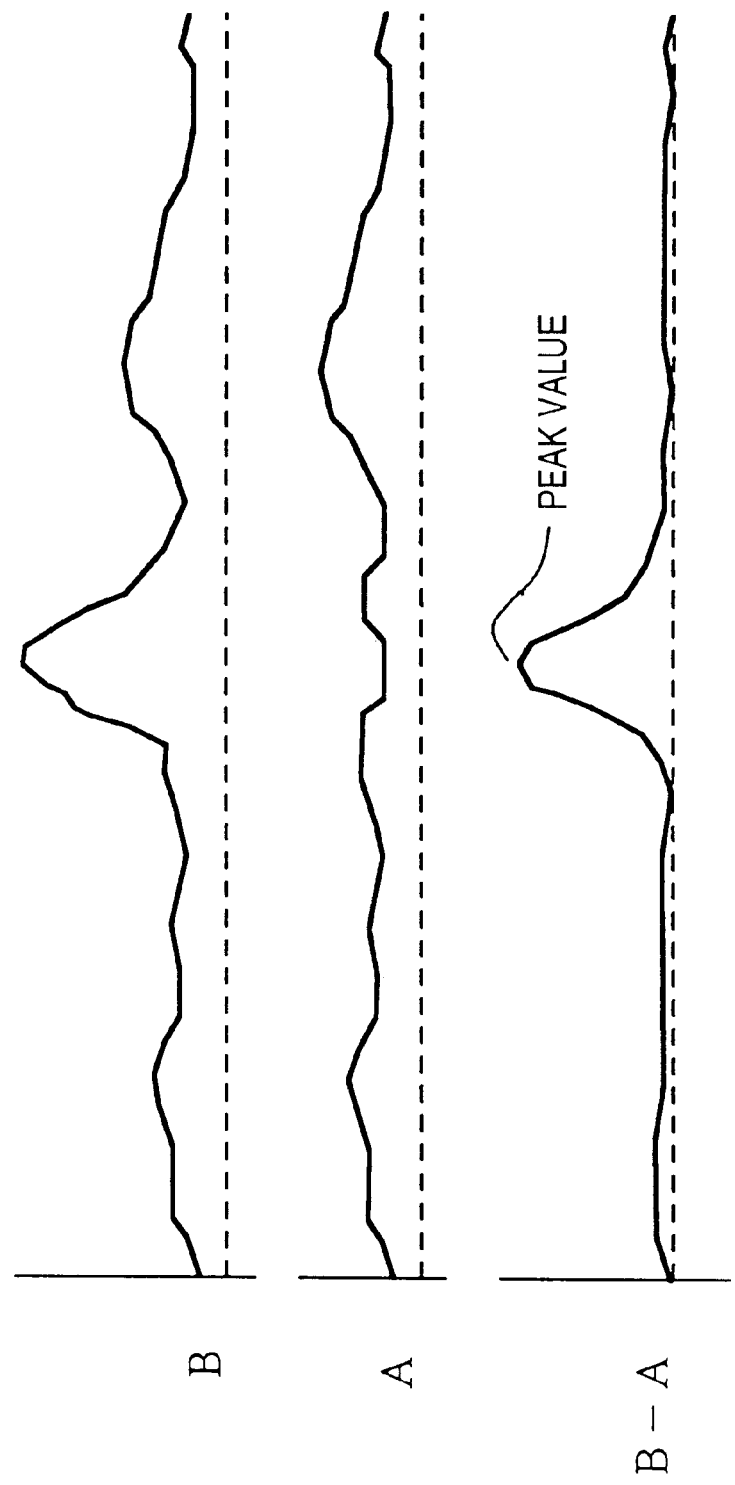
FIG. 9 is a diagram illustrating an example of output waveforms of the linear sensors according to the first embodiment.

FIG. 9 is a diagram illustrating an example of output waveforms of the linear sensor according to the first embodiment.

Waveform B in FIG. 9 is obtained when only a signal prevailing at the time of light emission from the light-emitting element 41 is read out, and waveform A is that in the absence of a light emission, i.e., a waveform which represents only extraneous light. (As shown in FIG. 8, the electric charge of pixels corresponding to the waveforms A and B is arrayed in contiguous fashion in the ring CCD 26.) The amplifier 29 non-destructively amplifies and outputs the difference (waveform B−waveform A) between the neighboring amounts of charge. As a result, a signal representing an image which is solely light from the designating tool 4 can be obtained and a stable coordinate input is possible without the effects of extraneous light (noise).

Let the maximum value of the difference B−A between the waveforms shown in FIG. 9 be defined as the peak value. If the storage time during which each of the linear sensors of linear sensors 20X, 20Y functions with respect to the light is lengthened, the peak value increases in conformity with this time. In other words, if the time of one period of the IRCLK signal is adopted as unit charging time and number n of times storage is performed is defined using this time as the unit, the peak value will be enlarged by increasing the number n of times storage is performed. By detecting that the peak value has attained a predetermined threshold value TH1, it is possible to obtain an output waveform having a constant quality at all times.

Figure 10:
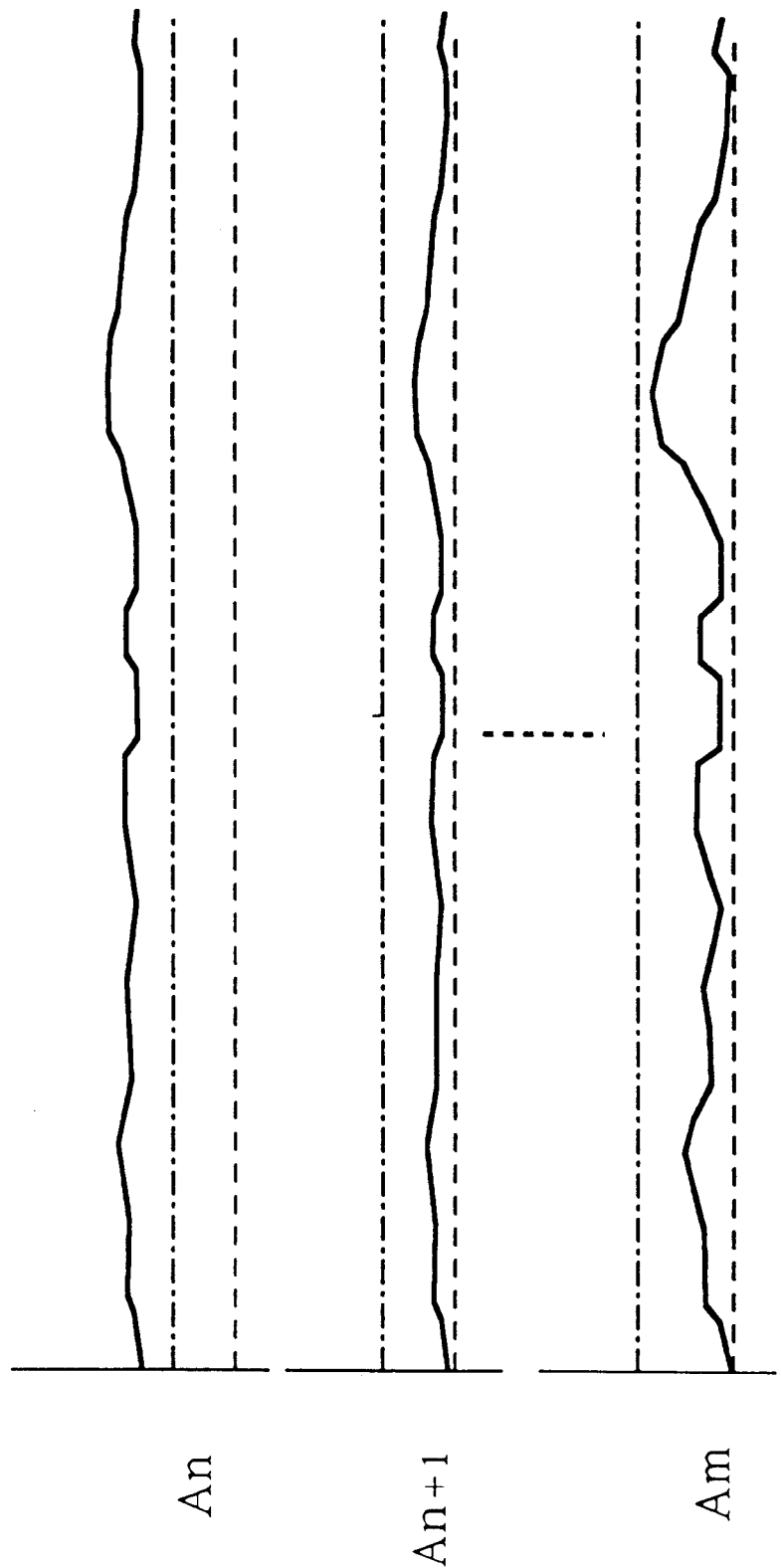
FIG. 10 is a diagram illustrating an example of an output waveform for describing a skimming operation of the linear sensor according to the first embodiment.

In a case where the extraneous light is very intense, there is the danger that the transfer charge of the ring CCD 26 will saturate before the peak of the difference B−A between the waveforms will become sufficiently large. In consideration of such a case, each of the linear sensors of linear sensors 20X, 20Y is provided with a SKIM unit 28 having a skim function. The SKIM unit 28 monitors the level of the signal which prevails in the absence of a light emission. When the signal level of a waveform indicated An exceeds a predetermined value (see the one-dot chain line in FIG. 10) at an nth charge in FIG. 10, a fixed amount of charge is extracted from each pixel of A and B. As a result, a waveform indicated at An+1 is obtained at the next (n+1)th charge. By repeating this operation, saturation will not occur and storage of signal change can continue even if extraneous light is very intense.

Accordingly, even if the amount of light from the designating tool 4 when light from the tool is turned on and off is very small, a sufficiently large signal waveform can be obtained by continuing the integrating operation a number of times. In particular, since the signal of a displayed image is superimposed in a case where a light-emitting source of the visible light region is used for the designating tool 4, a sharp waveform containing very little noise can be obtained by using the above-described skim function and differential output.

Control of the operation of linear sensors 20X, 20Y will now be described with reference to FIG. 11.

Figure 11:
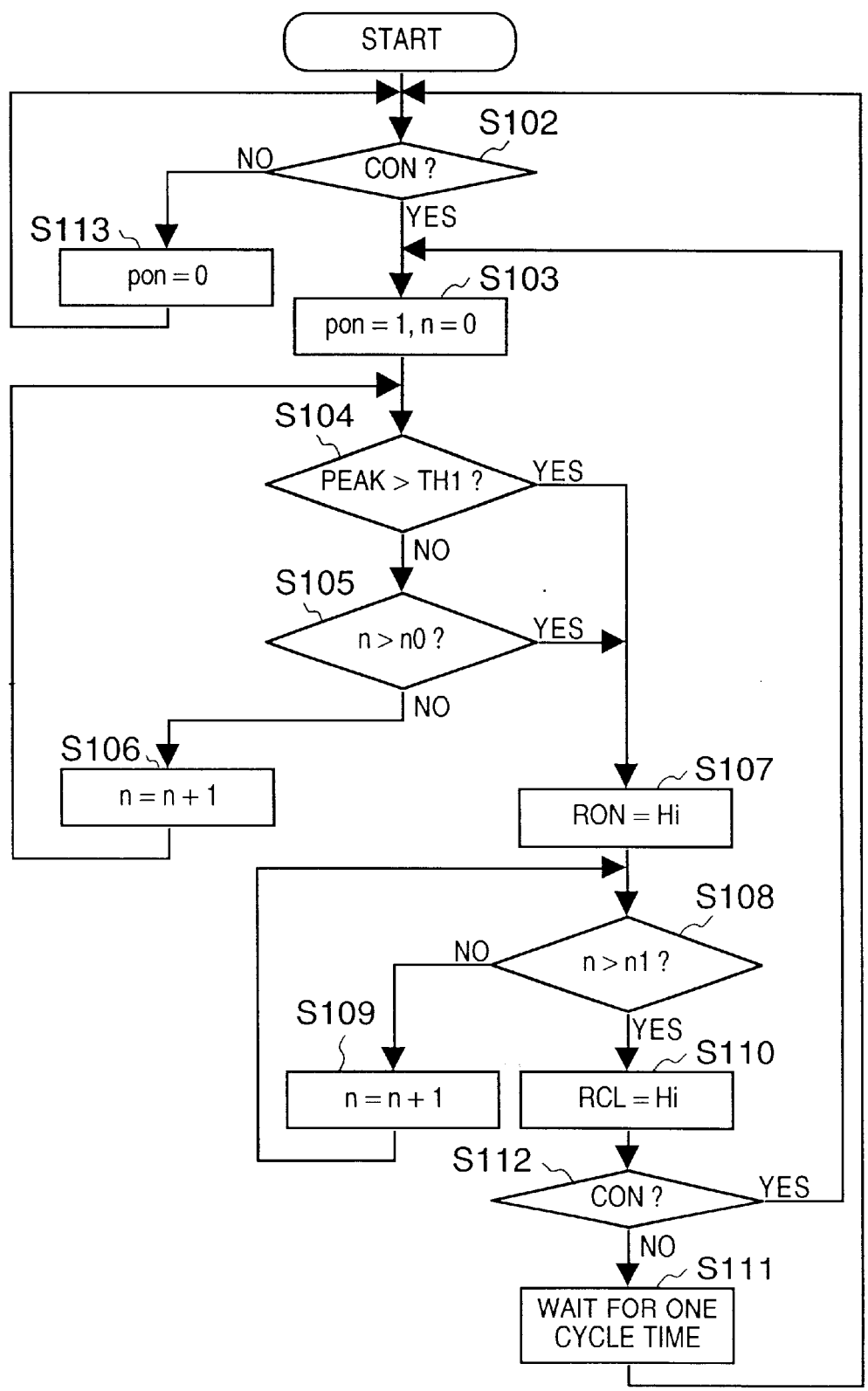
FIG. 11 is a flowchart illustrating control of operation of the linear sensors according to the first embodiment.

FIG. 11 is a flowchart illustrating control of operation of the linear sensors according to the first embodiment. When the sensor controller 31 starts sensor control, the controller monitors the signal CON at step S102. If the signal CON is at the high level ("YES" at step S102), control proceeds to step S103 and the number n of integrating operations is reset to zero. Next, at step S104, the controller determines whether the peak value (peak level) of the sensor output is greater than the predetermined threshold value TH1.

If the peak value is equal to or less than the predetermined threshold value TH1 ("NO" at step S104), the controller 31 determines whether the number n of integrating operations is greater than a first predetermined number n0. If the number n of integrating operations is equal to or less than the first predetermined number n0 ("NO" at step S105), control proceeds to step S106. Here the number n of integrating operations is incremented and control returns to step S104. On the other hand, if the peak value is greater than the predetermined threshold value TH1 ("YES" at step S104), or if the number n of integrating operations is greater than the first predetermined number n0 ("YES" at step S105), control returns to step S107. Here an integration-stop signal RON attains the high level and the integration operation is halted. Further, coordinate-value calculation by the coordinate calculation unit 32 starts.

This is followed by step S108, at which the sensor controller 31 determines whether the number n of integrating operations is greater than a second predetermined number n1. If the number n of integrating operations is equal to or less than the second predetermined number n1 ("NO" at step S108), control proceeds to step S109, at which the number n of integrating operations is incremented and control returns to step S108. On the other hand, if the number n of integrating operations is greater than the second predetermined number n1 ("YES" at step S105), control proceeds to step S110, the integration-stop signal RON falls to the low level and, at the same time, the sensor reset signal RCL attains the high level for a length of time that is several times the cycle of the signal LCK (twice the cycle of the signal LCK in the example of FIG. 10). Next, at step S112, the sensor controller 31 monitors the signal CON. If the signal CON is at the high level ("YES" at step S112), control proceeds to step S103. On the other hand, if the signal CON is at the low level ("NO" at step S112), control returns to step S111 and the system waits for one cycle time.

In other words, this operation is repeated during the time that the signal CON is at the high level, and the calculation of coordinates is carried out every cycle decided by second predetermined number n1. The step S111 is provided so as to hold the prevailing state only one time even if the signal CON drops owing to the effects of dust or the like. If the signal CON is at the low level for two consecutive cycles ("NO" at step S102), control returns to step S113, a flag PON is reset to 0, a sync-signal standby state is attained and control returns to the initial state.

The drop-out countermeasure can be lengthened beyond one cycle. It goes without saying that if external disturbance is small, then, conversely, the drop-out countermeasure can be shortened. It should be noted that a similar operation can be performed by adopting one cycle as a natural-number multiple of the period of the data clock, making this coincide with the timing of the sync clock and using a sync-code detection signal instead of the signal CON.

Light from the designating tool 4 that reaches the coordinate detector fluctuates owing to consumption of the power supply (battery) 44 accommodated within the designating tool 4 and is also caused to fluctuate by the attitude of the designating tool 4. In particular, in a case where the screen 10 diffuses little light, the frontal brightness of the displayed image rises but the attitude of the designating tool 4 causes a greater fluctuation in the amount of light input to the sensor. According to the present invention, however, even in this case the number of times integration is performed follows up automatically and a stable output signal can be obtained at all times. This provides excellent effects in which it is possible to detect coordinates in a stable manner. In a case where light impinges upon the sensor without being scattered much when the designating tool 4 is used as a pointer, light of considerable intensity enters the sensor. However, coordinates can be detected in stable fashion even in this case.

Further, in a case where joint use is made of a pen and pointer employing an LED used upon being brought into direct contact with the screen, it is possible to use an LED that produces a greater quantity of light. Accordingly, the first predetermined number of times n0 and second predetermined number of times n1, which are the number of integrating operations shown in FIG. 11, can be switched between upon differentiating between the pen and pointer based upon the ID signal. The sampling rate is raised in the case of the pen and is lowered in the case of the pointer. In actuality, a fine writing operation such as a character input is impossible with a pointer. Better operability is obtained writing a smooth line by a low sampling rate. Providing the changeover is advantageous for this purpose.

As described above, control of the timing of the integrating operation is carried out by a demodulated signal of a prescribed period obtained by applying a high-frequency carrier to light that is turned on and off and detecting the frequency of this carrier. As a result, the designating tool and the image sensing unit can be synchronized cordlessly, thus making it possible to realize a coordinate input apparatus that is very easy to use. A further advantage is that the apparatus can be operated easily at a position remote from the screen by using a laser beam. Further, since integration control means is provided in which integration is halted in response to detection of the fact that a peak level in a difference signal from an integrating unit has exceeded a predetermined level, a signal representing a beam-spot image of a substantially constant level can be produced even if the amount of light varies. This makes it possible to obtain results of coordinate calculation that are stable and high in resolution at all times.

<Calculation of Coordinate Values>

Coordinate calculation processing by the coordinate calculation unit 32 will now be described.

Figure 12:
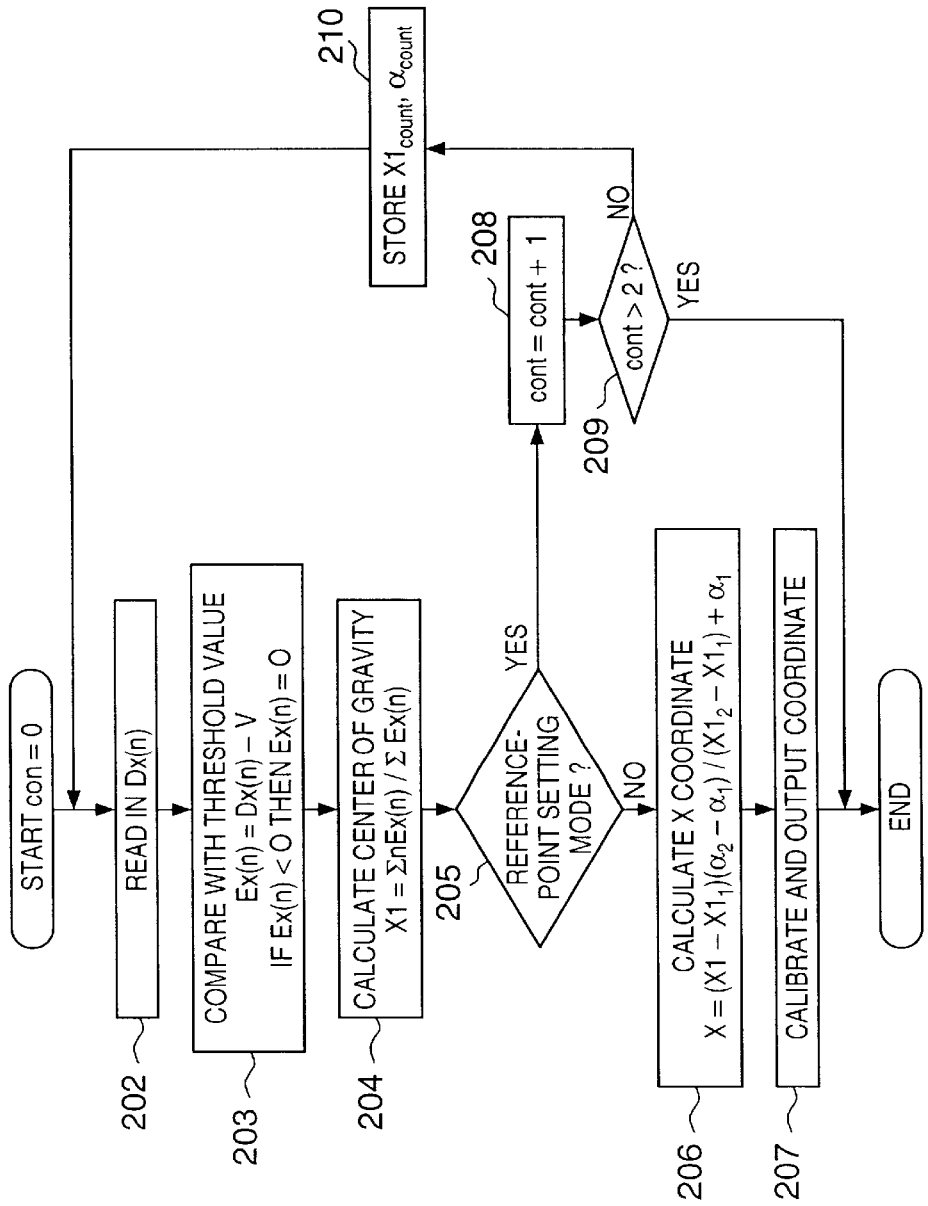
FIG. 12 is a flowchart illustrating coordinate calculation processing executed by a coordinate calculation unit according to the first embodiment.

FIG. 12 is a flowchart illustrating coordinate calculation processing executed by the coordinate calculation unit 32 of the first embodiment.

The output signals from the two linear sensors 20X, 20Y (the difference signal from the amplifier 29) obtained as described above are converted to a digital signal by the A/D converter 31A provided in the sensor controller 31, and the digital signal is transmitted to the coordinate calculation unit 32, whereby coordinates are calculated. In the calculation of coordinates, first coordinates (X1,Y1) on the sensor are obtained with respect to the output data in each of the X and Y directions. This calculation processing is the same for both X and Y and therefore will be described solely with regard to the X direction.

First, at step S202, difference data Dx(n) (number n of pixels in the first embodiment is equal to 64) which is a difference signal regarding each pixel at an arbitrary coordinate input point (a prescribed point the coordinates of which are already known in a reference-point setting mode, described later) is read in and stored in a buffer memory (not shown). Next, at step S203, the difference value is compared with a preset threshold value V and a data value Ex(n) greater than the threshold value is calculated. A coordinate X1 on the sensor is calculated at step S204 using the data value Ex(n). In the first embodiment, the center of gravity of the output data is calculated by the center-of-gravity method. However, it goes without saying that there are a number of calculation methods, one of which is a method (e.g., a differentiating method) of finding the peak value of the data value Ex(n).

It is determined at step S205 whether the prevailing mode is a coordinate calculation mode. In order to calculate coordinates from the center of gravity X1 of the output data, it is necessary to find a prescribed value in advance. A method of calculating this prescribed value (a reference-point setting mode) will be described.

The description will relate solely to the X direction. The designating tool 4 is placed at points (($\alpha 1,\beta 1$) and ($\alpha 2,\beta 2$) the X and Y coordinates of which on the screen 10 are already known, steps S202~S204 are executed, the center-of-gravity value of the X-direction sensor obtained at each of these points is calculated as $X1_1$ and $X1_2$, and these values and the already known values $\alpha 1$, $\alpha 2$ are stored at step S210. At the time of ordinary coordinate calculation using the stored values, the X coordinate of the coordinate input point to be calculated can be calculated at step S206. This is followed by step S207. Here, in order to provide a coordinate input apparatus having a higher performance, a coordinate-value calibration is performed as needed (as by correcting for distortion by software calculation in order to correct for lens aberration in the optical system) to finalize the coordinate value.

It goes without saying that is possible to output the finalized coordinate value as is in real time or to interpolate data (e.g., to output only one item of data for every ten finalized coordinates) in conformity with the particular purpose. This is important in a case where specifications indicated below are assumed.

The stability of the user's hand in a case where the designating tool 4 is used in the manner of a pen differs from that in a case where the designating tool 4 is used as a pointer remote from the screen. In a case where the designating tool 4 is used as a pointer, the cursor on the screen quivers minutely. Use as a pointer can be made easier, therefore, if this minute motion is suppressed. In a case where the designating tool 4 is used as a pen, on the other hand, rapid and faithful tracking is desired. In particular, when characters are written, an input cannot be made correctly unless the designating tool 4 can be manipulated by small, quick motions.

In the first embodiment, an ID is transmitted by a control signal. As a result, it is possible to determine whether the tool is being used as a pointer or not, i.e., whether the switch at the tip of the tool is being pressed. Thus, whether the tool is being used as a pointer or pen can be discriminated. In a case where the tool is being used as a pointer, an easy-to-use arrangement that is free of shaking can be obtained if coordinate values (X−1,Y−1) and (X−2, Y−2) obtained by the last operation and the operation that preceded it, respectively, are used to calculate a running mean which is then employed to compute the current output coordinates (X,Y). Further, though a simple running mean is used, various other methods can be used as functions employed in such smoothing processing. For example, the absolute value of a difference may be compressed non-linearly depending upon the size, or a predicted value based upon a running mean may be used to non-linearly compress a difference with respect to this value.

In other words, in a case where the designating tool 4 is used as a pointer, smoothing is emphasized; otherwise, a changeover is made to place less emphasis on smoothing. Since this changeover can be achieved by a control signal, it is possible to realize whichever state provides the best ease of use. This is another major effect of the present invention.

If the coordinate sampling frequency is 100 Hz, as mentioned above, it will suffice if the above-described processing ends in 10 ms. Insofar that the original data is a very small 64 pixels×2 (x and y)×8 bits (the A/D converter), a convergence operation is unnecessary. This means that satisfactory processing can be executed using a low-speed one-chip microprocessor. This is advantageous not only in terms of cost but also in that specifications can be changed with ease, development time can be shortened and derivative products can be developed with facility. In particular, development of a special-purpose LSI chip for executing high-speed image data processing, as in a case where an area sensor is used, is unnecessary. The invention therefore is superior in terms of development cost and development time, etc.

Data indicating the coordinate values (X,Y) calculated by the processing described above is sent from the coordinate calculation unit 32 to the communication controller 33. This data signal and the control signal from the control signal detector 72 are input to the communication controller 33. The data signal and the control signal are both converted to communication signals of a predetermined format and then sent to an external display control unit. As a result, it is possible to perform various operations such as input of a cursor, menu, characters and line drawings on the screen 10. Even in a case where a 64-pixel sensor is used, as described above, a high resolution of more than 1000 and a satisfactory precision are obtained, the sensor and optical system can both be made small in size and low in cost. In addition, a coordinate input apparatus in which the arithmetic circuit can be made very small in size can be obtained.

In a case where the sensor is constructed as an area sensor, four times the number of pixels and arithmetic data are required in order to double the resolution. By contrast, in a case where the sensor is constructed as a linear sensor, it will suffice to merely double the number of pixels for each of the X and Y coordinates. Accordingly, a higher resolution can readily be obtained by increasing the number of pixels.

In accordance with the first embodiment, as described above, the image sensing means for sensing the image of the beam spot 5 produced at any position on the screen 10 by the designating tool 4 is such that an image signal having a size that extends over several pixels is produced in a sensor array, which comprises the linear sensors 20X, 20Y, by an image-forming optical system focused so that resolution attains a predetermined magnitude, the output signals from these sensors are digitized at a data width of n bits or more, coordinates are calculated and coordinate values having a resolution that is approximately 2n times the number of pixels of the sensor array are output.

Accordingly, linear sensors and an optical system that are small and low in cost can be used, the arithmetic circuit also can be made small in scale, low in cost and high in performance, and the same arrangement can be used regardless of the size of the screen 10. This contributes to lower cost.

Further, as for the means for adjusting the resolution of the image-forming optical system, a diffusing plate comprising the infrared transmitting filter 92 and light diffusing film 93 is used instead of focusing, as a result of which the image-forming optical system can be assembled with ease. Further, in the case of curvature of the image surface, as when the view angle is large, a uniform resolution can be obtained.

By providing the above-described diffusing plate on the side of the image-forming optical system nearest the light source, it is possible to realize a coordinate input apparatus in which a high precision is obtained by mitigating the influence of distortion of the microstructure of the diffusing plate.

Further, by using a material having wavelength-selective transmissivity for the diffusing plate, it is possible to realize a coordinate input apparatus in which a high reliability is obtained by suppressing extraneous light.

Second Embodiment

Figure 13:
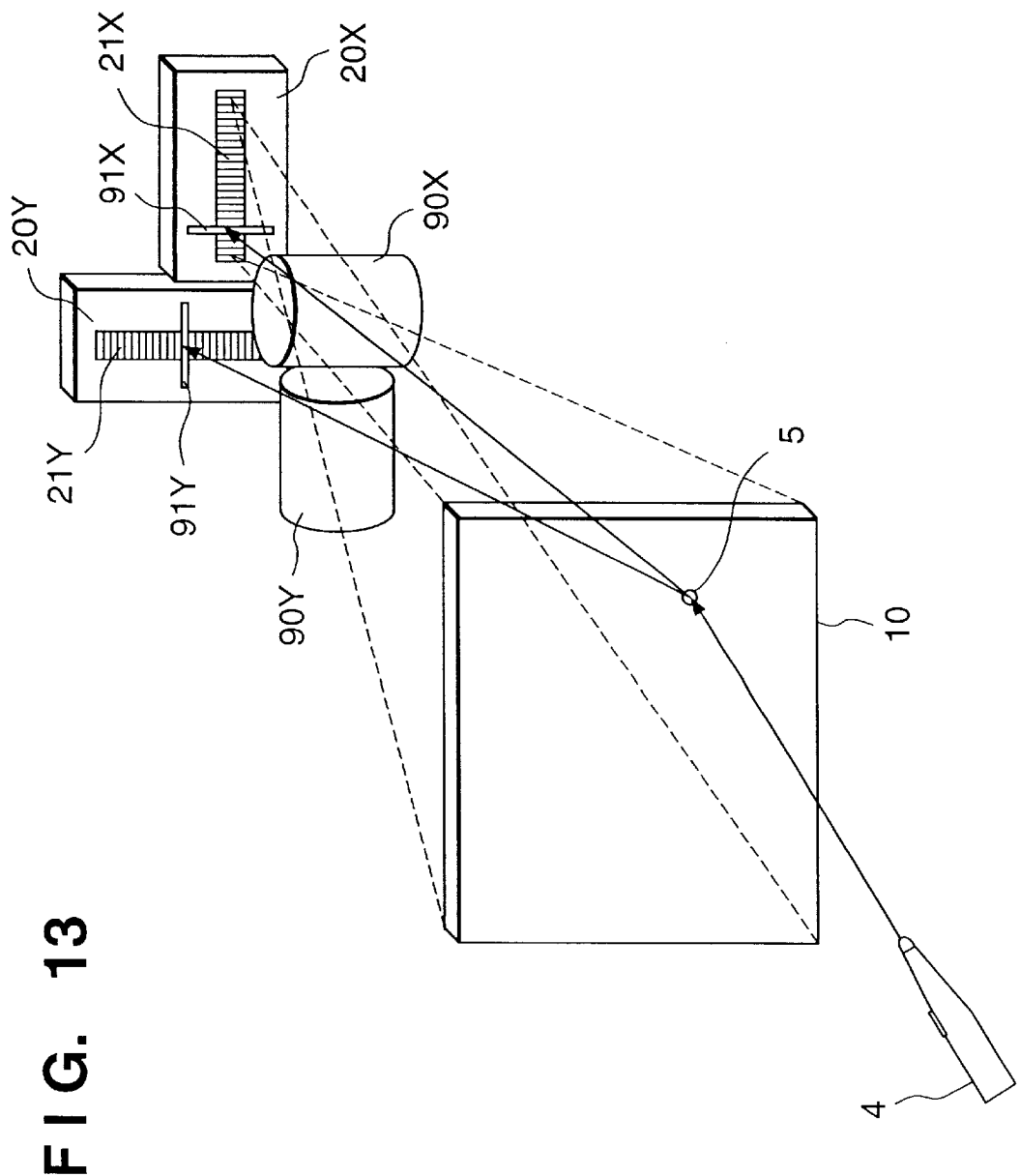
FIG. 13 is a diagram showing the positional relationship between linear sensors 20X, 20Y according to a second embodiment of the present invention.

As shown in FIG. 13, it is possible to adjust resolution merely by focusing the cylindrical lenses without using the light diffusing film 93 illustrated in FIG. 7. In this case, the number of parts can be reduced but a highly precise adjustment is necessary to achieve an appropriate resolution over the entire screen. In particular, in a case where the view angle is large, there are instances where it is difficult to realize this owing to curvature of the image surface.

Third Embodiment

Figure 14:
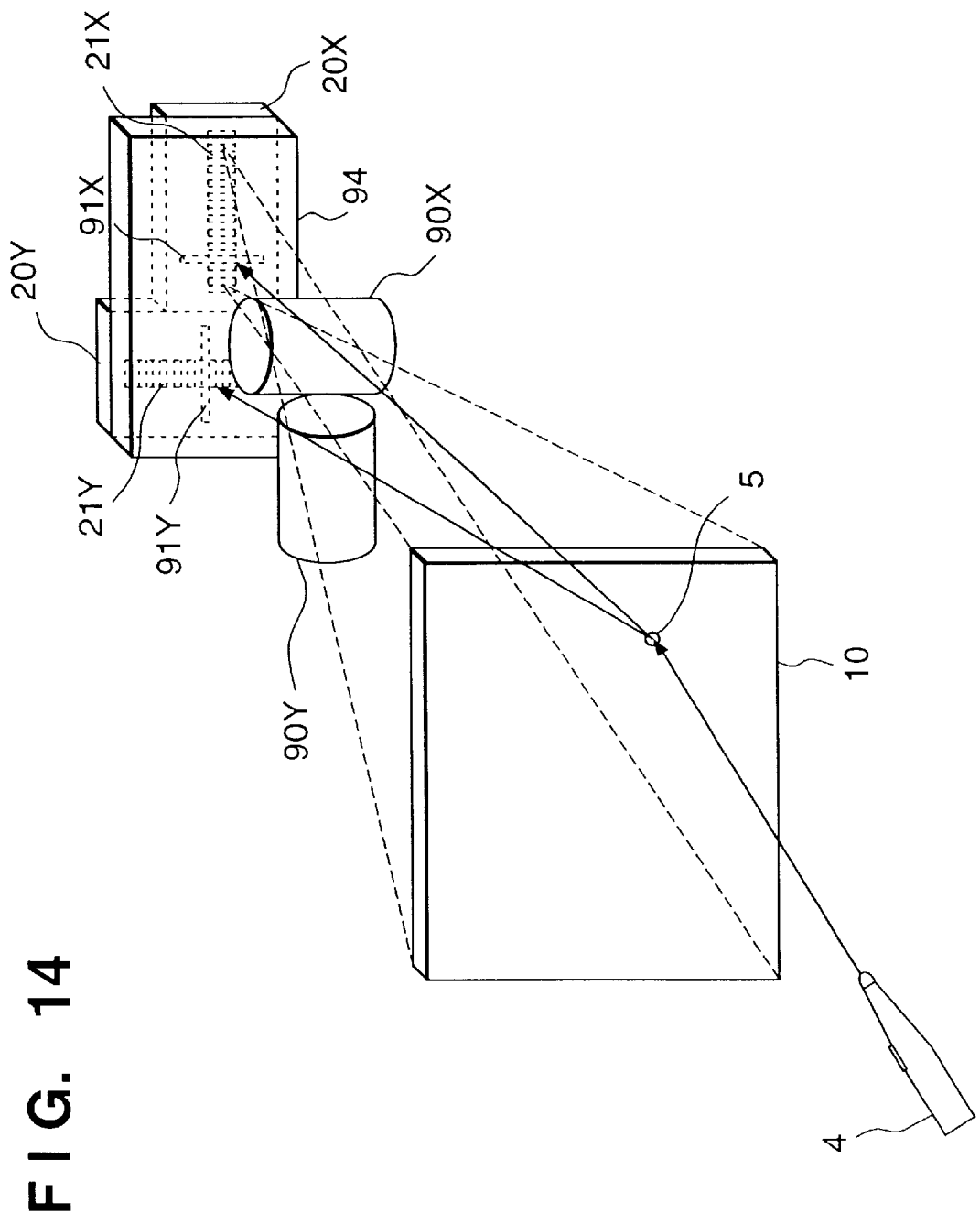
FIG. 14 is a diagram showing the positional relationship between linear sensors 20X, 20Y according to a third embodiment of the present invention.

As shown in FIG. 14, it is possible to adopt an arrangement in which a light diffusing filter 94 is bonded to the linear sensors 20X, 20Y on the side of the cylindrical lenses 90X, 90Y. In this case, the shape of the image is readily susceptible to the influence of the microstructure of the diffusing material. This makes it necessary to use a material that is extremely fine or to use a material, such as a crystal low-pass filter, that does not have a structure consisting of microvoids. However, this arrangement can be realized if the proper materials are used.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiments to a system or an apparatus, reading the program codes with a computer (e.g., a CPU or MPU) of the system or apparatus from the storage medium, and then executing the program codes.

In this case, the program codes read from the storage medium implement the novel functions of the embodiments and the storage medium storing the program codes constitutes the invention.

Examples of storage media that can be used for supplying the program code are a floppy disk, hard disk, optical disk, magneto-optical disk, CD-ROM, CD-R, magnetic tape, non-volatile type memory card or ROM, etc.

Furthermore, besides the case where the aforesaid functions according to the embodiments are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion board inserted into the computer or in a memory provided in a function expansion unit connected to the computer, a CPU or the like contained in the function expansion board or function expansion unit performs a part of or the entire process in accordance with the designation of program codes and implements the function of the above embodiments.

In a case where the present invention is applied to the above-mentioned storage medium, program code corresponding to the flowcharts shown in FIGS. 11 and 12 described earlier would be stored on this storage medium.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus for generating coordinates corresponding to a light spot produced by a designating tool, comprising:

first image sensing means, which is constructed on a first coordinate axis by a first image-forming optical system and a first linear sensor, for sensing the light spot;

second image sensing means, which is constructed on a second coordinate axis by a second image-forming optical system and a second linear sensor, for sensing the light spot; and light diffusing means for diffusing the image width of the light spot formed by each of said first and second image-forming optical systems;

wherein the first and second coordinate axes are orthogonal and an image width of the light spot formed by each of said first and second image-forming optical systems is diffused by the light diffusing means to several times the pixel pitch of the corresponding first and second linear sensors such that the light spot is sensed in several pixels of the first and second image sensing means.

2. The apparatus according to claim 1, further comprising adjustment means for adjusting the image width of the light spot formed by each of said first and second image-forming optical systems.

3. The apparatus according to claim 2, wherein said adjustment means is a light diffusing plate.

4. The apparatus according to claim 3, wherein said light diffusing plate is placed on the side of the coordinate input screen facing said image-forming optical systems.

5. The apparatus according to claim 3, wherein said light diffusing plate has wavelength-selective transmissivity.

6. The apparatus according to claim 3, wherein said light diffusing plate is constituted by an infrared transmitting filter and a light diffusing film.

7. The apparatus according to claim 3, wherein said light diffusing plate is bonded to said first and second linear sensors.

* * * * *

UNITED STATES PATENT AND TRADEMARK OFFICE
CERTIFICATE OF CORRECTION

PATENT NO. : 6,710,767 B1
DATED : March 23, 2004
INVENTOR(S) : Masahide Hasegawa et al.

It is certified that error appears in the above-identified patent and that said Letters Patent is hereby corrected as shown below:

<u>Column 4,</u>
Line 48, "s" should be deleted;
Line 49, "witches" should read -- switches --; and
Line 58, "s creen" should read -- screen --.

Signed and Sealed this

Seventh Day of September, 2004

JON W. DUDAS
*Director of the United States Patent and Trademark Office*